Feb. 1, 1949.    C. W. MULLER    2,460,305
DEVICE FOR SIMULATING AUTOMATIC RADIO COMPASS
INDICATIONS IN GROUND TRAINERS
Filed Dec. 9, 1940    5 Sheets-Sheet 1
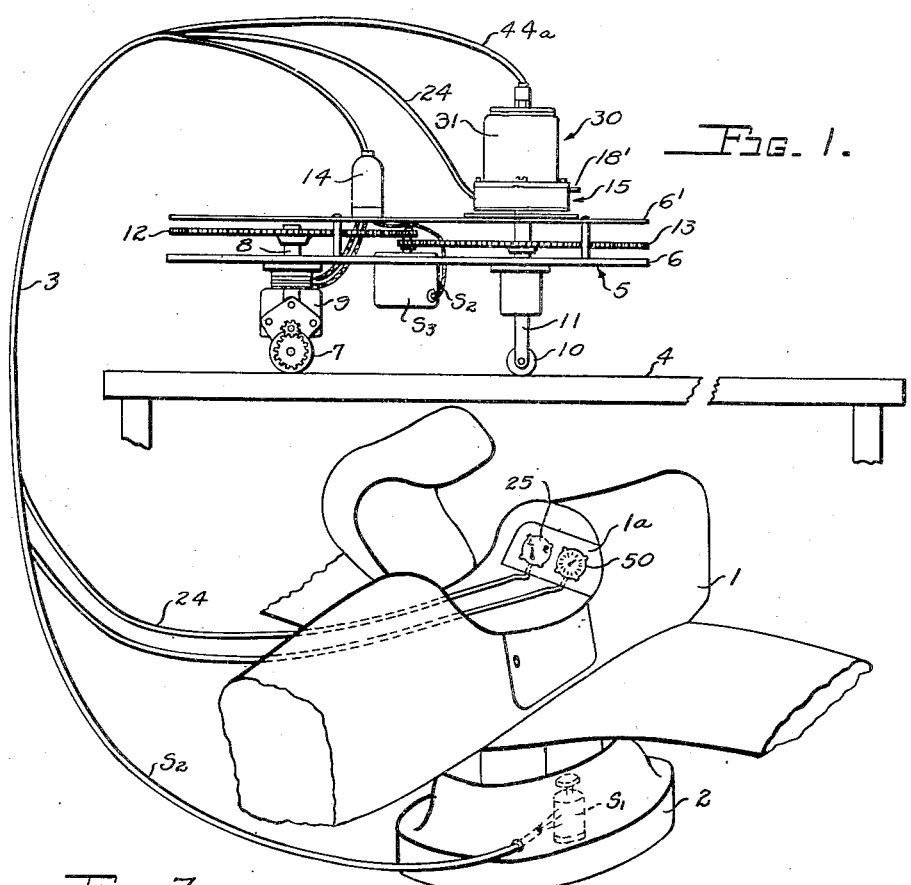
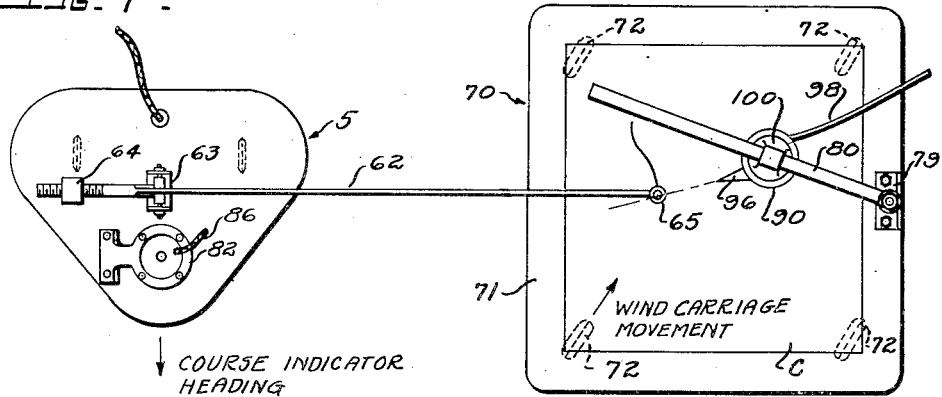
INVENTOR
CARL W. MULLER
BY Edgar H. Snodgrass
and Clade Koontz
ATTORNEYS Feb. 1, 1949.  C. W. MULLER  2,460,305
DEVICE FOR SIMULATING AUTOMATIC RADIO COMPASS
INDICATIONS IN GROUND TRAINERS
Filed Dec. 9, 1940  5 Sheets-Sheet 2
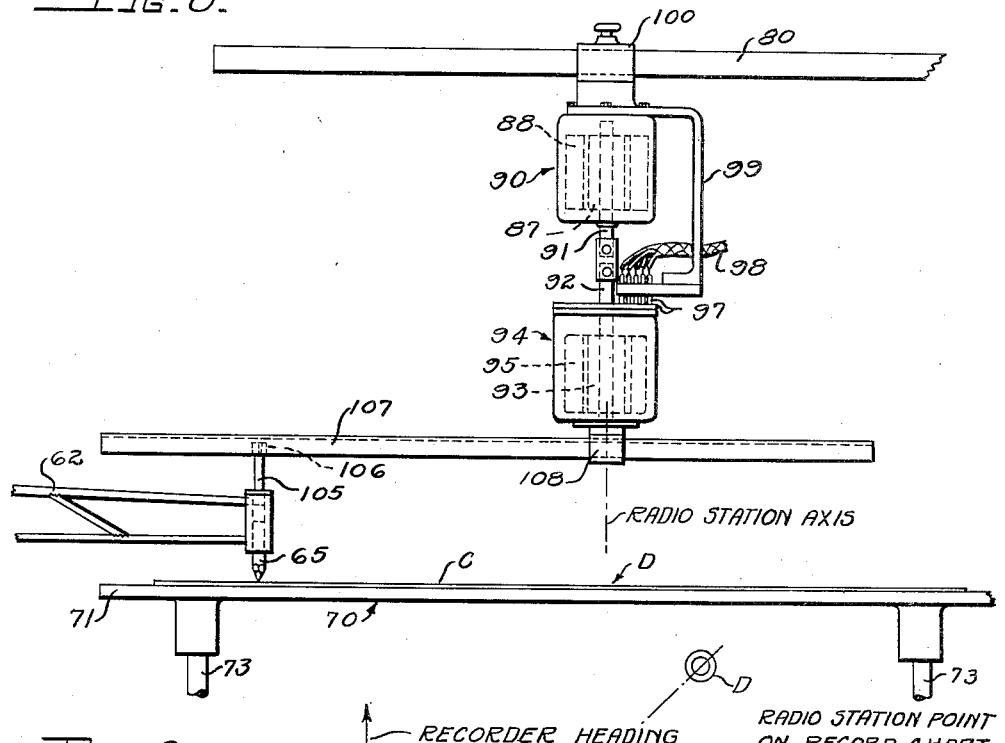
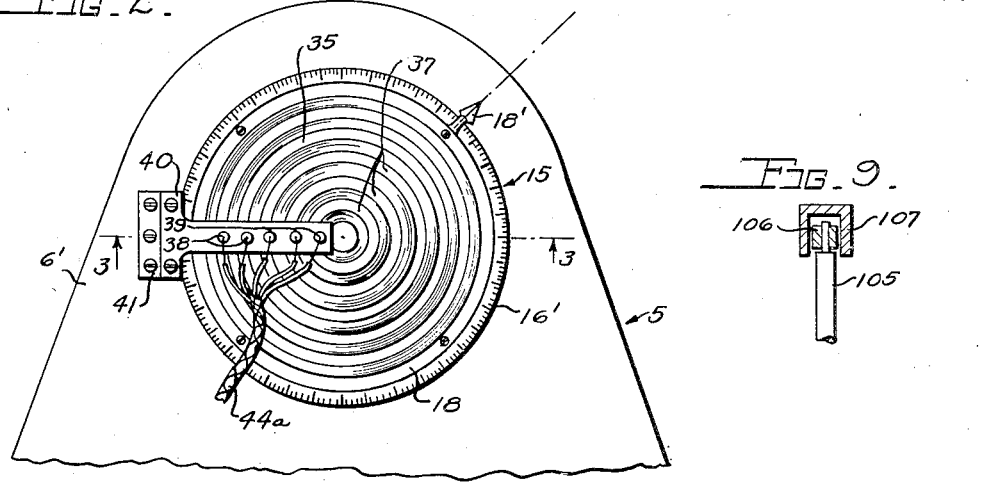

Feb. 1, 1949.  C. W. MULLER  2,460,305
DEVICE FOR SIMULATING AUTOMATIC RADIO COMPASS
INDICATIONS IN GROUND TRAINERS
Filed Dec. 9, 1940  5 Sheets-Sheet 3
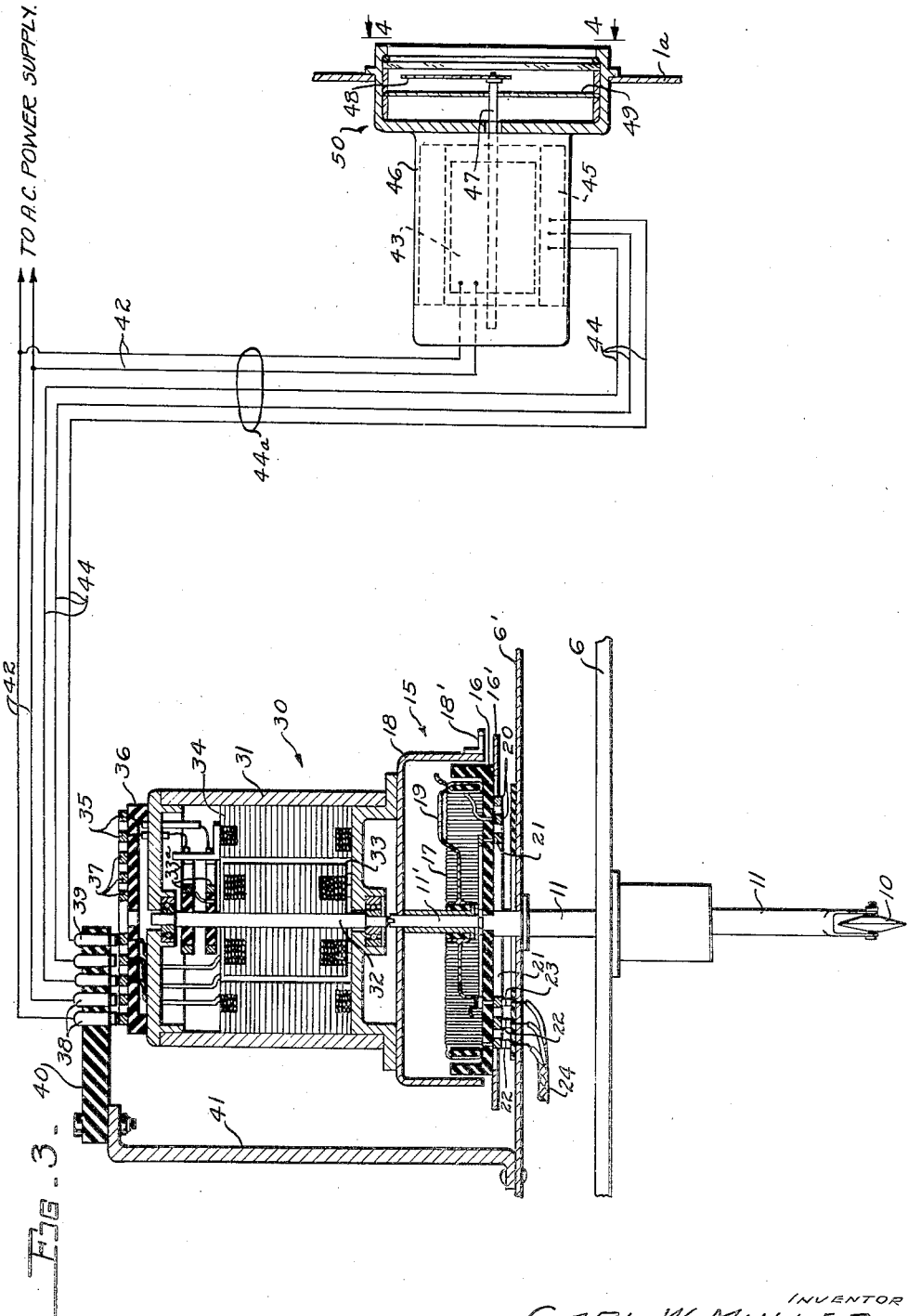
INVENTOR
CARL W. MULLER

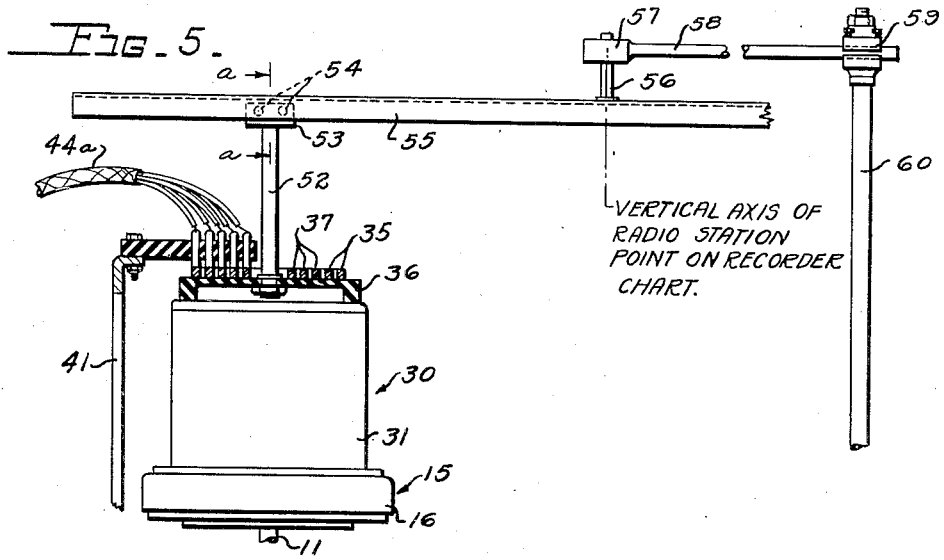
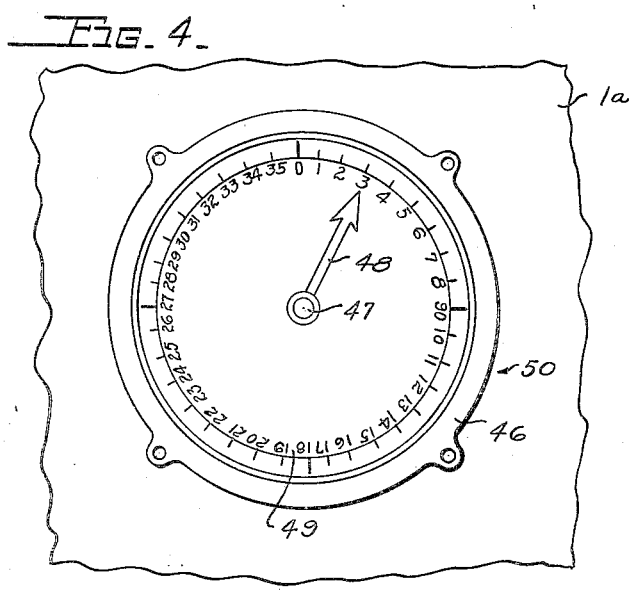
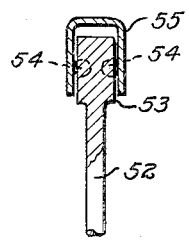

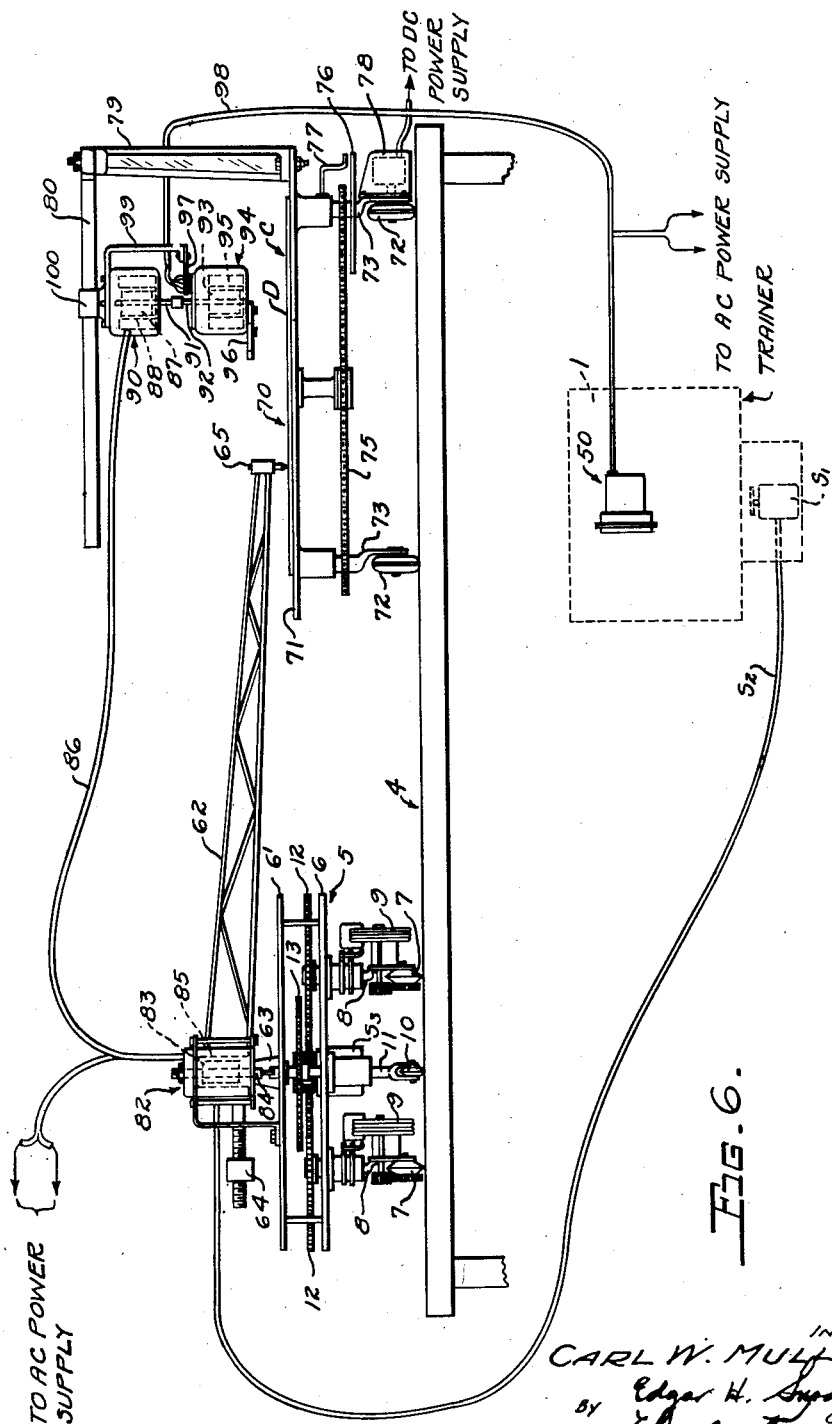

Patented Feb. 1, 1949

2,460,305

UNITED STATES PATENT OFFICE 2,460,305

DEVICE FOR SIMULATING AUTOMATIC RADIO COMPASS INDICATIONS IN GROUND TRAINERS

Carl W. Muller, Osborn, Ohio

Application December 9, 1940, Serial No. 369,275

14 Claims. (Cl. 35—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for simulating radio compass indications in an aviation ground trainer and more particularly relates to a means, either manually or automatically actuated, for controlling an indicating device, to continuously indicate the instant bearing of the flight trainer relative to an assumed radio station point, to thereby simulate the indication of the 360° type of radio compass indicators, now being employed in actual aircraft navigation.

This application forms a continuation in part of my co-pending application Serial No. 321,726, filed March 1, 1940 for "Automatic instrument landing signal control devices for aviation ground trainers," which application discloses among other things, a means for automatically actuating a radio compass indicator of the conventional Left-Right type in an aviation ground trainer, in accordance with the change in heading of the trainer with respect to an assumed radio compass transmitter station point, a similar automatic means being employed for actuating a continuous radio compass bearing indicator in accordance with the present invention.

Aviation ground trainers of the type with which the invention is concerned are well known in the art, one example being the "Link" trainer illustrated and described in United States Patents 1,852,462 and 2,179,663, granted to Edwin A. Link, Jr., and comprise a dummy aircraft resembling an airplane, tiltably and rotatably mounted on a stationary base and adapted to be positioned under the control of the occupant in various positions simulating the flight attitudes of an airplane. A course indicator or recorder is employed in conjunction with the trainer to trace the course of the assumed flight of the trainer on a record sheet, the course recorder comprising a wheeled carriage directionally controlled by the trainer and driven over the surface of a chart table through small motors geared to certain wheels at a speed proportional to the assumed airspeed of the trainer, one of the wheels when inked serving as a marker wheel. Such a course recorder is illustrated and described in the aforesaid U. S. Patent 2,179,663.

Trainers of the character described are also generally equipped with radio compass simulating means comprising a conventional electrical zero center type of indicating instrument having the well-known Left-Right indicia thereon and mounted on the instrument board of the ground trainer. The indicator is electrically connected to a potentiometer which has its resistance windings rotatably mounted concentric with the marker wheel supporting shaft, and rotated thereby, while potentiometer wiping contact arm is rotatably mounted on an extension of the marker wheel shaft and is freely rotatable relative thereto. A rotatable housing encloses the potentiometer windings and is provided with a pointer or sighting device and the housing is secured to the contact arm and may be manually rotated to keep the pointer aimed at a point on the reference chart, representing an assumed radio compass station. If the instant heading of the course indicator coincides with the axis of the pointer, the potentiometer contact arm and resistance windings will have relative positions, such that the indicator circuit will be balanced and the indicator in the trainer cockpit will be centered, thus giving the well-known "On Course" indication, while if the recorder heading is to the right or left of the axis of the pointer, the potentiometer circuit will become unbalanced, causing the indicator to give a corresponding Right or Left indication. In my aforesaid co-pending application I have illustrated an automatic means for actuating the manually controlled potentiometer above described, comprising an arm pivotally mounted at one end to rotate about an axis perpendicular to the record chart table and the said axis passing through the desired radio compass station point on the chart, the rotatable potentiometer contact arm carried by the course recorder being slidably but non-rotatably connected to the arm, so that any deviation of the heading of the course indicator from a course directed towards or away from the radio station point will cause relative motion between the potentiometer wiper contact arm and the resistance windings to cause the indicator to indicate the direction of the deviation.

Radio compass indicators for ground trainers of the type above described, are capable of indicating only the direction of the deviation of the heading of the trainer from a course directed towards or away from the assumed radio compass transmitting station and do not indicate the bearing of the assumed radio station with respect to the instant heading of the trainer, in the manner of the continuous 360° type of radio compass bearing indicators, now being employed in aircraft navigation.

In accordance with the invention a continuous radio compass bearing indicator for ground trainers of the character described, is provided, by employing a self synchronous generator or transmitter known in the art as an "autosyn" transmitter comprising rotor and stator elements, the rotor being secured to the marker wheel shaft of the course recorder and rotatable therewith, while the stator is preferably secured to the freely rotatable potentiometer housing element, previously described and is rotatable therewith. The rotor and stator of the "autosyn" transmitter unit are respectively electrically connected to the corresponding rotor and stator elements of an "autosyn" receiver or motor, similar in construction to the transmitter unit and mounted on the instrument board of the ground trainer. The rotor shaft of the receiver unit is adapted to actuate an indicator pointer which moves relative to a fixed scale, to indicate the bearing of the assumed radio compass station relative to the instant heading of the trainer. The electrical motion transmitting system has the well-known characteristics, that the rotor of the receiver will always have the same relative angular position with respect to its stator, as the relative angular position of the corresponding rotor and stator elements of the transmitter unit, so that if the rotor of the transmitter unit has its reference axis always corresponding to the instant heading of the trainer due to its connection to the marker wheel shaft and the reference axis of the stator is manually or automatically maintained so that it passes through the assumed radio compass station point on the reference chart, the pointer of the indicator will rotate through an angle indicating the angular difference between the reference axes, i. e., the bearing of the assumed radio compass station relative to the instant heading of the ground trainer. The stator of the transmitter may be automatically rotated by a means similar to that previously described and disclosed in my above identified co-pending application.

The invention also provides a means hereinafter described by which a bearing indicator of the continuous indicating type above noted, may be employed in conjunction with a wind simulating device, wherein the motion of the course recorder relative to its supporting surface no longer represents the trace of the assumed flight of the trainer relative to the ground, to again give the simulated radio compass bearing.

The principal object of the invention is the provision of a radio compass indicator for aviation ground trainers, which is simple in character, adapted for use with present equipment and capable of continuously indicating the bearing of an assumed radio compass transmitting station relative to the instant heading of the ground trainer.

A further object of the invention is the provision in radio compass simulating devices of the character described, of means for automatically actuating the indicator control means in accordance with the departure of the heading of the ground trainer from a course directed towards or away from an assumed radio compass transmitter station point.

A further object of the invention is the provision of a novel indicating device including an electrical motion transmitting device having a rotatable rotor element and a rotatable stator element, each of said elements being electrically connected respectively to the rotor and fixed stator elements of a corresponding electrical motion receiver, the rotor of the said receiver being adapted to actuate an indicating element, whereby when the rotor and stator of the transmitter are respectively angularly displaced in accordance with respective functions to be indicated, the said indicating element is angularly displaced with respect to a stationary reference indicia, an amount equal to the difference between the respective functions.

Other objects of the invention not specifically enumerated will appear by reference to the detailed description in the specification and the appended drawings in which:

Fig. 1 is a view illustrating an assembly of a manually controlled radio compass bearing indicator in accordance with the invention and used in conjunction with an aviation ground trainer; and Fig. 2 is a fragmentary plan view of the device of Fig. 1 illustrating the manner of operation; and Fig. 3 is a view partly in section illustrating the detailed construction of the device of Fig. 1; and Fig. 4 is a front elevation of the indicator dial as taken on line 4—4 of Fig. 3; and Fig. 5 is a view partly in section illustrating a means for automatically actuating the transmitter unit of the device of Fig. 1; and Fig. 5a is a view partly in section taken on line a—a of Fig. 5 and illustrating a roller guide employed in the device of Fig. 5; and Fig. 6 is a side elevation of a modified form of the invention as employed in conjunction with a wind simulating device; and Fig. 7 is a plan view illustrating the manner of operation of the device of Fig. 6; and Fig. 8 is a fragmentary view illustrating means for automatically actuating the device of Fig. 6.

Fig. 9 is a view partly in section illustrating a roller guide employed in the device of Fig. 8.

Referring to Fig. 1 the reference numeral 1 represents an aviation ground trainer of the type illustrated in the aforementioned patents granted to Edwin A. Link. The trainer is provided with an instrument panel $1a$, for supporting various navigating and other aircraft instruments by which the student is guided during the course of an assumed flight in the trainer. Rotation of the trainer about a vertical axis causes the generator or transmitter $S_1$ of the well-known self-synchronous electric transmission type to transmit the rotation of the trainer to a corresponding self-synchronous receiver $S_3$, electrically connected to the transmitter by conductors $S_2$. The receiver $S_3$ is adapted to directionally control a course recorder generally indicated by the reference numeral 5, which moves over the surface of the record table 4. The course recorder 5 of the type previously described, includes a frame made up of frame members 6 and 6', respectively, which is adapted to be propelled by means of a pair of rollers 7 supported by shafts 8, which are journalled in suitable bearings carried by the frame member 6, the rollers 7 being driven by means of small electric motors 9, which are geared thereto and rotatable with the shaft 8 about a vertical axis. The motors 9 are adapted to be supplied by alternating current of a suitable frequency from a source not shown. The speed of the rollers 7 is such that the movement of the course recorder 5, over the surface of the record table, represents to some preselected scale the air speed of the trainer 1. The course recorder 5 is also provided with a third roller 10, supported by a shaft 11, which is suitably journalled in a bearing carried by the frame member 6. The roller 10, when inked, serves the function of a marker wheel to trace the assumed flight course of the trainer on a record sheet or map placed on the table 4. The shafts 8, each have mounted thereon a gear 12 and a similar gear 13 is mounted on the marker wheel shaft 11, the gears 12 and 13 being connected by suitable pinion gears to the rotor shaft of the receiver $S_3$, so that the rotor of the receiver may rotate the shafts 8 and shaft 11 and the corresponding rollers 7 and 10, through the same angle in azimuth as the change in heading of the trainer 1. The course recorder is thus steered by the trainer so that the heading of the recorder will always correspond to the instant heading of the trainer. The course recorder 5 has a potentiometer 15 mounted on the marker wheel shaft 11 and electrically connected by means of conductors in a cable 24, which are electrically connected to a Left-Right indicator 25, mounted on the instrument board 1a, of the trainer 1 and forming a radio compass indicating device of the type previously described as well-known to those skilled in the art. This potentiometer may be manually controlled to indicate by means of the indicator 25, any departure in the heading of the course recorder 5 and the trainer 1, from a course directed towards or away from an assumed radio compass transmitting station point represented by some selected point D on the reference chart. The structure so far described is conventional and well-known in the art.

In accordance with the invention, a self-synchronous or "autosyn" transmitter unit generally indicated by the reference numeral 30, is mounted on the casing of the potentiometer 15, and is electrically connected by means of conductors in a cable 44a to a radio compass indicating device 50 of the 360° type. When the casing of the "autosyn" transmitter 30 is manually rotated to maintain the pointer 18' secured to the housing of the potentiometer 15 always pointing towards the aforementioned radio compass station point D (Fig. 2), on the reference chart, the indicator 50 will indicate the bearing of the assumed radio compass station with respect to the instant heading of the trainer 1 in the manner hereinafter described.

Referring now to Fig. 3 in which the detailed construction of the continuous bearing indicating radio compass simulating means is illustrated, it is seen that the potentiometer unit 15, of the type well-known in the prior art comprises a base 16, formed of insulating material and secured adjacent the upper end of the marker wheel shaft 11, of the course recorder and is rotatable therewith. A suitable dial member 16' having compass heading indicia thereon, is secured to the lower portion of the base 16 and is rotatable therewith. Suitable potentiometer resistance windings 17, are carried by the member 16, and are engaged by a rotatable wiper contact arm 19, rotatable with the housing 18, which in turn is freely rotatably mounted on an extension 11' of the marker wheel shaft 11. The potentiometer windings 17 are electrically connected to slip rings 20, secured to the underside of the element 16; and the potentiometer contact arm 19 is similarly adapted to be electrically connected to a slip ring 21, also arranged on the underside of the supporting element 16. The slip rings 20 and 21 are adapted to be engaged by brushes 22 and 23 respectively, suitably mounted on the upper frame member 6' of the course recorder and electrically connected to conductors in a cable 24, which in turn are electrically connected to the Left-Right indicator 25 on the trainer instrument panel 1a as previously described. The potentiometer housing 18 is provided with a pointer or sighting device 18', such that when the pointer 18' is maintained pointing towards the assumed radio compass station point by manual rotation of the housing 18, the potentiometer circuit will be balanced, if the instant heading of the course indicator is also directed towards or away from the assumed radio compass station point. If the heading of the course recorder is other than directly towards or away from the assumed radio compass point, the potentiometer circuit will become unbalanced and the indicator 25 will indicate the direction of the departure from the desired course in the manner previously described.

The potentiometer housing 18 of the prior art structure serves as a convenient support for an "autosyn" transmitter unit generally indicated by the reference character 30 and including casing 31, which is bolted to the potentiometer housing 18, concentric with the axis of the marker wheel shaft 11. A shaft 32 is journaled by means of suitable bearings in the casing 31, and rotatably connected by means, for an example the well-known screwdriver type of driving connection, to the extension portion 11' of the marker wheel shaft 11. The shaft 32 has two pole wound rotor 33, rigidly mounted thereon and rotatable therewith and a corresponding stator 34, having three phase windings thereon is arranged concentric with the rotor 33 and mounted in the casing 31, to be rotatable therewith. The windings of the rotor 33 are adapted to be electrically connected by means of the usual slip rings and brushes 33a, to a pair of slip rings 35, mounted on a base 36 of insulating material, secured to the upper end of the housing 31. The three phase windings of the stator 34 are similarly electrically connected to slip rings 37, also secured on the supporting base 36, the slip rings 35 and 37 being arranged concentric with the axis of the rotor shaft 32 and the marker wheel shaft 11, and being freely rotatable with the housing units 18 and 31. Slip rings 35 are respectively engaged by stationary brushes 38 and the slip rings 37 are respectively engaged by similar stationary brushes 39, the brushes 38 and 39 being supported by an arm 40, made of insulating material and secured to a mounting bracket 41, which is bolted or otherwise secured to the upper frame member 6' of the course recorder 5. The brushes 38, are electrically connected by means of conductors 42, to the rotor 43 of an "autosyn" receiver 46, forming part of the indicator 50. The brushes 39 are similarly connected by means of conductors 44 to the windings of the stator 45 of the indicator "autosyn" receiver 46. The conductors 42 and 44 are enclosed to form a cable 44a. The rotor 43 is provided with a shaft 47, which is adapted to rotate an indicating pointer 48, relative to a stationary scale 49 having a bearing indicia thereon for indicating by the position of the pointer relative thereto, the bearing of the assumed radio compass station with respect to the instant heading of the trainer (see Fig. 4). The rotors of the "autosyn" transmitter 30 and the "autosyn" receiver 46, are supplied with alternating current from a suitable power supply not shown.

The operation of the device of Figures 1 to 4, is as follows. With the trainer 1 and the course recorder 5 assumed to be in operation and it being desired to continuously indicate the bearing of an assumed radio compass station point on the reference chart with respect to the instant heading of the course recorder and associated ground trainer, the instructor manually rotates the housing 18 of the potentiometer unit 15, until the pointer 18' is aimed at the selected radio compass station point D on the reference charts (see Fig. 2). This rotation of the potentiometer housing simultaneously causes rotation of the housing 31, of the "autosyn" transmitter unit 30 and also causes rotation of the stator 34. The angular position of the rotor of the "autosyn" transmitter 30, is however, determined by the position of the marker wheel shaft 11, and the plane of rotation of the marker wheel 10, which has its directional heading controlled by the instant heading of the trainer 1. The electrical characteristics of an "autosyn" repeater system are such, that the rotor of the receiver unit will always have the same relative angular position with respect to its associated stator, as the relative angular relations which exist between the rotor and stator of the transmitter unit. Since the rotor and stator of the "autosyn" receiver unit 46 of the indicator 50, are respectively electrically connected to the corresponding rotor and stator of the transmitter unit 30, the rotor 43 of the "autosyn" receiver 46 will rotate through an angle relative to the stationary stator 45, equal to the annular displacement of the rotor 33 of the "autosyn" transmitter unit 30, relative to its associated stator 34, and since the reference axis of the rotor corresponds to the instant heading of the course recorder and trainer, and the reference axis of the stator corresponds to the heading of the assumed radio compass station point with respect to the assumed position of the trainer, the relative angular displacement of the elements of the transmitter unit will correspond to the bearing of the assumed radio compass station point D, with respect to the instant heading of the trainer and this bearing will be indicated to the student in the trainer by the position of the pointer 48 of the indicator 50, relative to the scale and the dial 49. Thus, throughout the entire course of assumed trainer flight, the instructor by manipulation of the housing of the transmitter unit 30 can cause a continuous indication of the relative bearing between the assumed radio station compass point D on the reference chart and the instant heading of the trainer to be transmitttd to the student. Manual operation of the casing 31 of the "autosyn" transmitter unit 30, also entails rotation of the potentiometer housing 18, so that the prior art radio compass indicator 25 can if so desired be simultaneously operated in conjunction with the continuous bearing indicator 50, or in case that both indications are not desired, the Left-Right indicator 25 may be rendered inoperative, by suitable switch means not shown.

It will be noted by inspection of Fig. 3, that the structure of the novel continuous radio compass bearing indicating system can be easily applied to existing ground trainer equipment without necessitating any changes therein.

Referring now to Fig. 5. In order to relieve the instructor of the duty of continuously maintaining the pointer 18' and stator 31 of the "autosyn" transmitter unit 30 aligned so that the reference axis of the stator is always directed towards the assumed radio compass station point on the reference chart, automatic means for performing this function are illustrated. The automatic rotation of the stator of the "autosyn" transmitter unit 30 is accomplished by providing an extension shaft 52, concentric with the axis of the marker wheel shaft 11, and rigidly secured at its lower end to the insulating base member 39, which in turn is rigidly mounted on the casing 31 of the "autosyn" transmitter unit 30, as previously noted. At its upper end, the shaft 52 is provided with an enlarged rectangular head 53, which is provided with ball bearings 54 and inserted into the open side of an inverted U-shaped channel member 55, which is pivotally mounted by means of a shaft 65, in a bearing 57, formed on the outer end of an adjustable rod 58, which may be secured by means of an adjustable clamp 59 to a vertical support 60, which is adapted to be secured at its lower end to the reference table 4, by means not shown. By reference particularly to Figure 5a, it is seen that the head or guide 53 may move axially with respect to the longitudinal axis of the channel member 55, but cannot rotate relative to the channel. The axis of the shaft 56 is so arranged that it intersects the surface of the chart on the reference table at the desired point D (Fig. 2), which is to represent the position of the assumed radio compass station. If the course recorder 5 is moving on a line directly towards or away from the axis of the shaft 56, the channel member 55 will cause no rotation of the shaft 52 and the housing 31 of the transmitter unit 30, and the reference axes of the rotor and stator of the transmitter unit will be in alignment and the indicator 50 will read zero. The channel member 55, however, will always maintain the referenec axis of the stator coincident with the longitudinal axis of the channel; and hence if the course recorder and trainer heading should depart from a heading directed towards or away from the radio station compass point, relative angular displacement between the rotor and stator elements of the transmitter unit will occur and a corresponding indication of the relative bearing between the radio compass station and the heading of the aircraft will be given by the indicator 50 in exactly the same manner as if the instructor had manually manipulated the housing of the transmitter unit 30.

A disadvantage of the ground trainer and course recorder is that with the prior art type of recorder it is not possible to simulate the effects of winds acting on an aircraft during flight, since the course recorder will indicate the course of the assumed flight of the trainer with respect to the ground, only if no cross wind effects are considered in the problem. In order to simulate the effects of winds assumed to be acting on the trainer during the course of the assumed flight thereof, it is necessary to employ an additional device in conjunction therewith to introduce the effect of winds into the problem, and one type of such a device of a simple character is disclosed in the co-pending application, Serial No. 334,002, filed May 8, 1940, for "Improvements on apparatus for simulating wind effects in aviation ground trainers," in the name of Carl J. Crane, the construction of which, however, forms no part of the present invention. This application has matured into Patent No. 2,450,421 dated October 5, 1948. A modification of the device of Fig. 1, adapted to correctly indicate simulated compass bearings when employing a wind simulating device of the type disclosed in the above mentioned co-pending application, Serial No. 334,002, is illustrated in Fig. 6.

Referring to Fig. 6, the course recorder 5 of the conventional type previously described is provided with a light tubular arm 62, extending outwardly therefrom and pivotally supported in a bracket 63, secured to the upper frame member 6', and the mass of the arm 62 being suitably counterbalanced by means of an adjustable weight 64. At its outer end the arm 62 has secured thereon a suitable holder for a marking element 65. The marker 65 is adapted to impress a record on the chart C, mounted on the movable table of a wind simulating device or wind carriage generally indicated by the reference numeral 70. The wind carriage comprises a table portion 71, suitably supported by means of rollers 72, carried by vertical shafts 73, which are suitably journaled in bearings carried by the table 71. The roller shafts 73 each have concentrically mounted thereon a suitable chain sprocket, which sprockets are inter-connected by means of a chain 75 passing thereover and one of the shafts 73 is provided with a disk 76, which has suitable angular indicia marked thereon and cooperating with a reference pointer 77 carried by the table portion 71 to indicate the direction of the assumed wind. By rotation of the disk 76 the rollers 72 may be simultaneously rotated through equal angles, thus permitting the rollers to be set at will for any desired wind direction. The table 71, is adapted to be propelled over the surface of the record table 4 by means of a small adjustable speed motor 78, which is drivably connected to one of the rollers 72, so that the wind carriage may be driven relative to the table 4, in a direction corresponding to the direction of a wind assumed to be acting on the ground trainer during the conduct of the flight problem and at a velocity proportional in a pre-determined scale to the assumed velocity of the wind.

The operation of the wind simulating device in conjunction with the conventional course recorder is such that the marker 65 has an absolute displacement relative to reference surface 4, at a velocity and in a direction corresponding to the velocity and direction of the course recorder 5, while the motion of the chart relative to the table 4 corresponds to the direction and velocity of the assumed wind. The relative motion between the marker 65 and the chart C will then truly represent the ground track of the assumed flight of the trainer when encountering the assumed wind. The wind indicator thus far described, is illustrated and described in the aforementioned Crane application, Serial No. 334,002.

In order to apply a continuous indicating radio compass device in accordance with the invention when employing a wind simulating device of the character described, a vertical support 79 is secured to the table 71, of the wind carriage 70 and it is arranged so that an arm 80 may be secured thereto, and placed in any desired position parallel with the surface of the table 71.

The course recorder 5 is provided with an "autosyn" transmitter unit 82, having its casing suitably secured by means of supporting brackets to the upper frame member 6' of the course recorder, the stator 85 being non-rotatable with respect to the course recorder frame. The rotor 83 of the "autosyn" transmitter unit 82 has its shaft 84 rigidly secured to and rotatable with the marker wheel shaft 11. The rotor and stator of the "autosyn" transmitter 82, are respectively electrically connected by means of conductors in the cable 86 to the corresponding rotor 87 and stator 88 of an "autosyn" receiver unit 90. The rotor shaft 91 of the "autosyn" unit 90 is rigidly coupled to the shaft 92 of the "autosyn" rotor 93 of an "autosyn" transmitter unit, generally indicated by the reference numeral 94. The casing and stator 95 of the "autosyn" transmitter unit 94 are freely rotatable and provided with a sighting pointer 96, and similar in character to the pointer 48', Figs. 1 and 2. The rotor and stator of the "autosyn" transmitter 95 are suitably electrically connected through the means of a slip ring and brush assembly 97, identical in construction to the slip ring and brush assembly elements 36 to 41 inclusive of Fig. 1, and by means of conductors in the cable 98 to the indicator unit 50, identical in construction with the indicator illustrated in the Figs. 1, 3 and 4, and similarly mounted in the trainer 1. A brush assembly 97, is suitably supported by means of a bracket 99 forming part of an adjustable mounting 100, which may be outwardly positioned at any desired point along the arm 80, such that the axis of the rotor shafts 91 and 92 will intersect the chart C on the wind carriage table 71 at the point D, representing the assumed radio compass station point.

The operation of the device of Fig. 6 is as follows. In the device of Fig. 6, the frame 6 of recorder 5 does not rotate about a vertical axis as the recorder changes heading so that if the frame is initially orientated with a reference axis thereof lying in a north-south plane, rotation of the marker wheel shaft relative to the selected axis on the frame will correspond to the instant heading of the ground trainer. Since the stator 85 of the transmitter 82 is fixed to the recorder frame 6 and the transmitter rotor 83 is turned by the marker wheel shaft 11 the relative angular displacement between the rotor and stator elements of transmitter 82 corresponds to the value of the trainer heading in degrees measured from north. The frame 71 of the wind drift carriage 70 similar to the recorder frame does not rotate about a vetical axis as the wind heading is changed. When the frame 71 is properly orientated with respect to a north-south axis a fixed reference axis on the stator of receiver 90 will be parallel to a corresponding axis on transmitter 82 and hence the rotor 87 of the receiver 90 will rotate in synchronism with the rotor 83 of the transmitter 82. The heading of a fixed reference axis on rotor 87 will therefore have a heading corresponding to the instant heading of the trainer. Similarly since the rotor 93 of the transmitter 94 is coupled to the receiver rotor 87 a selected reference axis on this rotor will also correspond to the heading of the trainer. Since the stator 95 of the transmitter 94 is freely rotatable, setting pointer 96 pointing to the marker 65 corresponds to establishing a line from the airplane represented by marker 65 through the point D on the chart C representing the radio compass transmitting station and the relative angular position of the rotor and stator will be an angular measure of the bearing of the radio compass station with respect to the heading of the airplane represented by the trainer. This same relative angular displacement between the rotor and stator of transmitter 94 which is the bearing value to be indicated will be indicated on the dial of the indicator unit 50 provided that the recorder and wind carriage frames are correctly orientated. Zeroing the indicator unit 50 may also be accomplished by rotating the dial 49 of the indicator by means (not shown) well known in the art.

Fig. 8 illustrates a means for mechanically rotating the stator 95 of the "selsyn" transmitter 94, in accordance with the position of the marker element 65, which is actuated by the course recorder 5, as in Fig. 6. This automatic actuating means is similar to that previously described with reference to Fig. 5, and comprises a vertical shaft element 105, secured to the extension frame 62 in concentric relation with the marker element 65 and provided at its upper end with a roller 106, which extends within the open portion of the inverted U-shaped channel member 107, which is secured to the casing of the "autosyn" transmitter 94 by means of a U shaped clip 108. Any movement of the marker element 65 and shaft 105 from a course directed towards or away from the radio compass station point D on the reference chart C, carried by the wind carriage 70 will cause rotation of the casing of the transmitter unit in exactly the same manner as if the instructor had rotated the casing by hand, using a pointer to obtain alignment with the marker element 65.

While in Fig. 6 the "autosyn" transmitter unit 82 has been illustrated as mounted on and actuated by the course indicator 5, it is obvious that for the purposes of the invention, this transmitter unit could as well be directly actuated by the ground trainer in accordance with the changes in the heading thereof, without in any way effecting the simulated radio compass bearing indicated by the indicator 50 in the ground trainer cockpit.

While the novel concept, in a self-synchronous transmitter-repeater system, of having the rotor and stator of the transmitter each mounted for rotation, the rotor being angularly positioned in accordance with one function (the trainer heading) and the stator being rotatably mounted and angularly positioned in accordance with another function (the line connecting the instant assumed position of the trainer with the assumed radio compass transmitter station point), is illustrated as applied to a radio compass simulating means, such an electrical transmission or repeater system can be employed for many other useful purposes. One application of such a repeater system would be in conjunction with a compass, where the rotor of the "autosyn" would be rotated in accordance with the heading of a ship, while the stator of the transmitter would be manually or otherwise rotated to have its reference axis directed towards another vessel, the indicator then indicating the bearing of the other vessel relative to the instant heading of the ship. The repeater device might also be applied to indicate the lack of synchronism in the speeds of two shafts and whether a particular one of said shafts was lagging behind or leading the other shaft. This result could be accomplished by driving the rotor of the "autosyn" transmitter from one of the shafts and driving the stator of the transmitter in the same direction by the other of said shafts. If the shafts are running in synchronism and are in phase, the pointer of the indicator would indicate zero, while if the shaft driving stator was lagging behind or leading the other shaft, the pointer of the indicator would rotate in either counter-clockwise or clockwise directions respectively; and if the shafts again became synchronized but out of phase, the indicator would indicate the phase difference.

While several forms of the invention have been illustrated in the drawings, it will be apparent to those skilled in the art, that other embodiments and changes may be made falling within the scope of the invention as defined by the appended claims.

I claim:

1. A device for aviation ground trainers for simulating the indications of a radio compass of the continuous bearing indicating type, comprising an indicator including a pointer and a reference dial, an electrical self-synchronous receiver for actuating said pointer and including two relatively angularly displaceable elements, a corresponding electrical self-synchronous transmitter including two rotatable elements, each electrically connected to a respective one of said receiver elements, means for rotatably positioning one of said transmitter elements in accordance with the instant heading of the associated ground trainer and means for rotatably positioning the other of said transmitter elements in accordance with the assumed position of said trainer relative to an assumed radio station point, relative rotation of said transmitter elements causing a corresponding angular displacement of said receiver elements to cause a displacement of the pointer of said indicator to continuously indicate the bearing of the assumed radio station point relative to the instant heading of the trainer.

2. In combination, an aviation ground trainer for simulating the flight of an aircraft, a reference surface, a course indicator movable relative to said reference surface at a velocity proportional to the assumed flight velocity of said aircraft and directionally controlled by said trainer, an indicator mounted in the cockpit of said trainer, an electrical self-synchronous receiver operatively connected to said indicator to actuate the same and including a fixed stator and a rotor movable relative thereto, a corresponding electric self-synchronous transmitter having rotatable rotor and stator elements, each respectively electrically connected to the corresponding rotor and stator elements of said receiver and means for mounting said transmitter on said course indicator so that the rotor element thereof is angularly positioned by said course indicator in accordance with the instant heading of said trainer and the stator of said transmitter being mounted concentric with respect to said transmitter rotor and freely rotatable so that the reference axis of said stator may be continuously maintained directed towards an assumed radio compass station point on said reference surface.

3. The structure as claimed in claim 2, in which said indicator includes a stationary dial having compass bearing indicia thereon, and a pointer cooperating with said dial, said pointer being rotated relative to said dial by relative angular displacement between the rotor and stator elements of said self-synchronous receiver.

4. The structure as claimed in claim 2, including means for rotatably positioning the stator of said self-synchronous transmitter so that the reference axis thereof is directed towards the said assumed radio compass station point, comprising an arm rotatably mounted to pivot about an axis perpendicular to said reference surface and intersecting said surface at the said assumed radio compass point, and means for connecting said arm to the stator of said transmitter to permit free longitudinal movement of said stator with respect to said arm but preventing rotation of said stator with respect to said arm.

5. In combination, an aviation ground trainer for simulating the flight of an aircraft, a course indicator for indicating relative to a chart the simulated flight of said aircraft and directionally controlled by said trainer, a radio compass simulating means including an indicator mounted in said trainer for indicating the bearing of the instant heading of said trainer with respect to an assumed radio compass transmitting station point, motion transmitting means including interconnected transmitter and receiver elements, said receiver element being operative to actuate said indicator and said transmitter including two rotatable elements, one of said transmitter elements being rotatably positioned by said course indicator in accordance with the instant heading of said trainer and the other of said transmitter elements being adapted to be rotatably positioned in accordance with the instant position of said course indicator relative to a point on said chart representing an assumed radio station point, and means for transmitting a motion equivalent to the relative angular displacement of said transmitter elements to said indicator through the medium of said receiver so that said indicator continuously indicates the bearing of said assumed radio station point relative to the instant heading of said course indicator and said trainer.

6. The structure as claimed in claim 5, in which the means for rotatably positioning the other of said transmitter elements in accordance with the instant position of said course indicator relative to a point on the chart representing an assumed radio station, is a manually actuated means.

7. The structure as claimed in claim 5, in which the means for rotatably positioning the other of said transmitter elements in accordance with the instant position of said course indicator relative to a point on the chart representing an assumed radio station, comprises an arm pivotally mounted to rotate about an axis coincident with said assumed radio station point on said chart and a connection between said arm and the said other transmitter element, the said connection restraining any relative rotation between said arm and said other transmitter element, but allowing free relative longitudinal motion therebetween in accordance with the change in position of said course indicator.

8. A radio compass indicating system for aviation ground trainers, comprising a supporting surface, a motor driven carriage movable on said surface at a velocity proportional to an assumed airspeed of an aircraft and directionally controlled by the associated trainer, a reference chart, means for propelling said chart relative to said supporting surface at a velocity and in a direction proportional to the velocity and in a direction equivalent to an assumed wind, an indicator element carried by said carriage and movable relative to said chart to indicate the assumed ground track of said aircraft, a bearing indicator, a motion transmitting means including a transmitter and a receiver, the latter operatively connected to said indicator to actuate the same, said transmitter including two rotatable elements, one of which is adapted to be rotatably angularly positioned by said carriage in accordance with the instant heading thereof, and the other of said rotatable transmitter elements being adapted to be angularly positioned in accordance with the instant position of said indicating element relative to a point on said reference chart representing an assumed radio station, said bearing indicator being positioned by said receiver to indicate the relative angular position of said transmitter elements to thereby indicate the bearing of the assumed radio station with respect to the instant heading of said carriage.

9. In combination, an aviation ground trainer for simulating the flight of an aircraft, a supporting surface, a carriage movable relative to said supporting surface at a velocity proportional to the assumed airspeed of said aircraft and directionally controlled by said trainer, an indicating element carried by said carriage, a reference chart, means for moving said reference chart relative to said supporting surface at a velocity and in a direction simulating an assumed wind, relative movement between said indicating element and said chart representing the assumed ground track of said aircraft, a bearing indicator mounted in said trainer, a motion transmitting device including a transmitter and a receiver, said receiver being operatively connected to said bearing indicator to actuate the same and said transmitter including two rotatable elements, means for angularly positioning one of said rotatable transmitter elements in accordance with the instant heading of said trainer and means for simultaneously angularly positioning the other of said rotatable transmitter elements in accordance with the position of a point on said reference chart representing an assumed radio station relative to the said indicating element carried by said carriage.

10. The structure as claimed in claim 9, in which the means for angularly positioning the other of said transmitter elements is a manually actuated means.

11. The structure as claimed in claim 9, in which the means for angularly positioning the other of said transmitter elements comprises an arm pivotally mounted to rotate about an axis coincident with the point on said reference chart representing an assumed radio station, and means connecting said arm and the said other rotatable transmitter element, said connecting means preventing relative rotation of said other element and said arm while permitting free relative longitudinal movement between said other element and said arm.

12. In combination, an aviation ground trainer for simulating the flight of an aircraft, a reference chart, a carriage propelled at a velocity proportional to the assumed airspeed of said aircraft and subjected to directional control by said trainer, an indicator element carried by said carriage and having a resultant motion relative to said chart to indicate the ground track of the assumed flight of said aircraft, means for introducing one component of said resultant motion equivalent to the instant heading of said trainer and proportional to the assumed airspeed of said trainer, means for introducing a second component of said resultant motion equivalent to the direction and proportional to the velocity of an assumed wind, a bearing indicator mounted in said trainer, a motion transmitting means including a transmitter and a receiver, said receiver being operatively connected to said bearing indicator to actuate the same, said motion transmitter including two rotatable elements, one of said elements adapted to be rotatably angularly positioned in accordance with the instant heading of said trainer, and the other of said elements being adapted to be rotatably angularly positioned in accordance with the instant position of said indicator element relative to a point on said chart representing an assumed radio transmitting station, the relative angular position of said transmitter elements being transmitted to said receiver and indicated by said bearing indicator as the instant bearing of said assumed radio station with respect to the instant heading of said trainer.

13. The structure as claimed in claim 12, in which the means for rotatably angularly positioning the said other transmitter element is a manually actuated means.

14. The structure as claimed in claim 12, in which the means for rotatably angularly positioning the said other transmitter element comprises an arm pivotally mounted to rotate about an axis coincident with the point on said reference chart representing an assumed radio transmitting station and a connection between said arm and the said other transmitter element which restrains said element from rotation with respect to said arm but permits free longitudinal movement of said element with respect to said arm.

CARL W. MULLER.

REFERENCES CITED

The following references are of record in the file of this patent:

UNITED STATES PATENTS

| Number | Name | Date |
|---|---|---|
| 1,293,747 | Ford | Feb. 11, 1919 |
| 1,655,244 | Rowell | Jan. 3, 1928 |
| 1,785,241 | Bates | Dec. 16, 1930 |
| 2,038,059 | Reichel | Apr. 21, 1936 |
| 2,099,857 | Link | Nov. 23, 1937 |
| 2,151,793 | Patin | Mar. 28, 1939 |
| 2,164,412 | Koster | July 4, 1939 |
| 2,179,663 | Link | Nov. 14, 1939 |
| 2,361,956 | Moseley | Nov. 7, 1944 |

OTHER REFERENCES

Aeronautics Bulletin No. 27 of Bureau of Air Commerce, July 1, 1937, pages 26–29.